United States Patent
Biggs

(12) 
(10) Patent No.: US 6,800,312 B1
(45) Date of Patent: Oct. 5, 2004

(54) MARSHMALLOW SYSTEM

(76) Inventor: Miles J. Biggs, 2850 McCammon Rd., Rockford, TN (US) 37853

(*) Notice: Subject to any disclaimer, the term of this patent is extended or adjusted under 35 U.S.C. 154(b) by 228 days.

(21) Appl. No.: 10/106,664

(22) Filed: Mar. 26, 2002

(51) Int. Cl.⁷ .................................. A23G 3/00
(52) U.S. Cl. .................. 426/103; 426/571; 426/573; 426/660
(58) Field of Search .................. 426/103, 571, 426/573, 660, 466, 94

(56) References Cited

U.S. PATENT DOCUMENTS

| | | |
|---|---|---|
| 2,847,311 A | 8/1958 | Doumak et al. |
| 4,039,688 A | 8/1977 | Hayward et al. |
| 4,120,627 A | 10/1978 | Abe |
| 5,429,830 A * | 7/1995 | Janovsky et al. ............. 426/94 |
| 5,731,020 A | 3/1998 | Russo |
| 6,224,920 B1 | 5/2001 | Reinikainen et al. |
| 6,296,884 B1 | 10/2001 | Okerlund |
| 6,616,963 B1 * | 9/2003 | Zerby et al. ................ 426/660 |

* cited by examiner

*Primary Examiner*—N. Bhat
(74) *Attorney, Agent, or Firm*—Luedeka, Neely & Graham PC

(57) ABSTRACT

A marshmallow system, including a marshmallow having a bore defined therein and a chocolate portion configured for being received within the bore, wherein the chocolate may be positioned within the bore and the thus prepared marshmallow/chocolate portion exposed to heat to toast the marshmallow and substantially melt the chocolate portion.

10 Claims, 1 Drawing Sheet

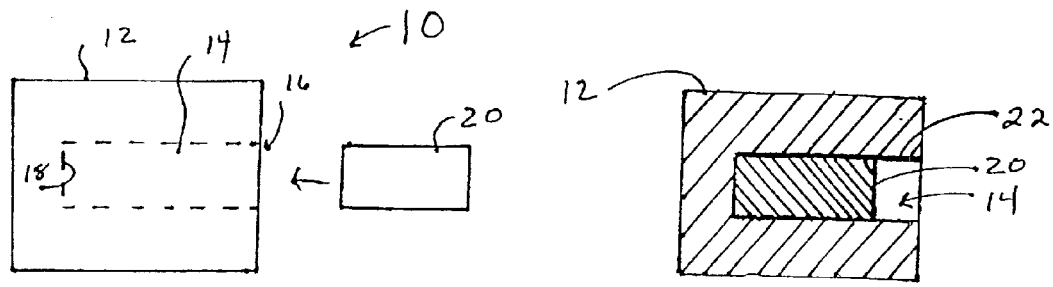
FIG. 1
FIG. 2
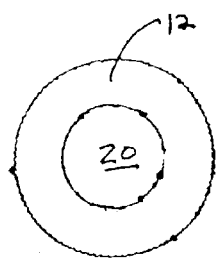
Fig. 3
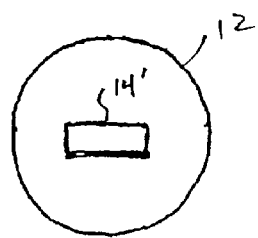
FIG. 4
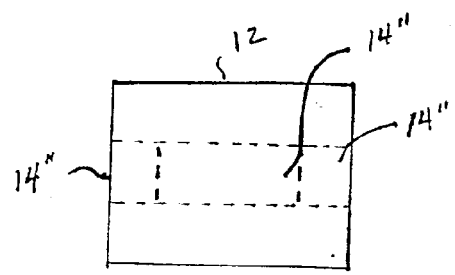
FIG. 5
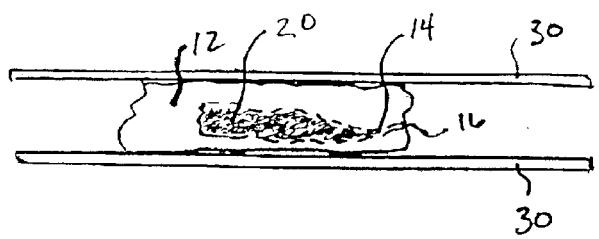
FIG. 6

MARSHMALLOW SYSTEM

FIELD OF THE INVENTION

This invention relates generally to food products. More particularly, it relates to a system for facilitating the making and enjoyment of marshmallows and chocolate in combination.

BACKGROUND AND SUMMARY OF THE INVENTION

A common camping activity consists of sitting around a fire and making s'mores. S'mores are a snack food consisting of a marshmallow and chocolate sandwiched between two graham crackers. Generally, the marshmallow is roasted over the fire and then placed in between the graham crackers with portions of chocolate. The toasted marshmallow causes the chocolate to melt, making a tasty, gooey snack. However, the chocolate, when melted, has a tendency to spread beyond the cracker and drip, thus making a mess.

In one aspect, the invention relates to a marshmallow system. In a preferred embodiment, the system includes a marshmallow having a bore defined therein and a chocolate portion configured for being received within the bore, wherein the chocolate may be positioned within the bore. The thus prepared marshmallow/chocolate portion is exposed to heat to toast the marshmallow and substantially melt the chocolate portion.

The toasted marshmallow/melted chocolate combination can be enjoyed in this state without undue mess, or combined with graham crackers or the like to make a s'mores snack.

Thus, in another aspect, the invention relates to method of making a s'mores snack. In a preferred embodiment, the method includes the steps of providing a marshmallow system including a marshmallow having a bore defined therein and a chocolate portion configured for being received within the bore, positioning the chocolate within the bore, exposing the thus prepared marshmallow/chocolate portion to heat to toast the marshmallow and substantially melt the chocolate portion, and pressing the marshmallow and heated chocolate combination between a pair of food substrates to provide the s'mores snack.

The bore includes an open end that tends to close to substantially retain the melted chocolate within the bore to more effectively inhibit spillage and other messes as compared to conventionally prepared s'mores.

BRIEF DESCRIPTION OF THE DRAWINGS

Further features of preferred embodiments of the invention will become apparent by reference to the detailed description of preferred embodiments when considered in conjunction with the figures, which are not to scale, wherein like reference numbers, indicate like elements through the several views, and wherein, FIG. 1 is an exploded side view of a preferred embodiment of a marshmallow component and a chocolate component in accordance with the invention.

FIG. 2 is a side view showing the components of FIG. 1 integrated.

FIG. 3 is an end view of the integrated components of FIG. 2.

FIG. 4 is an end view of another embodiment of a marshmallow component.

FIG. 5 is a cross-sectional side view of an alternative embodiment of a marshmallow component having a bore passing through the complete length of the marshmallow.

FIG. 6 is a side view of an assembled snack item in accordance with an embodiment of the invention.

DETAILED DESCRIPTION

With initial reference to FIGS. 1–3, there is shown components of a marshmallow system 10 in accordance with a preferred embodiment of the invention. The system 10 preferably includes a marshmallow 12 having a blind bore 14 extending from an open end 16 to a terminal end 18. A hard chocolate portion 20 is configured for insertion into the bore 14 via the open end 16.

The chocolate portion 20 is preferably sized to be fully received by the bore 14. Most preferably, the chocolate portion 20 has a length that is less than the length of the bore 14 so that when the chocolate portion 20 is fully inserted into the bore 14, an overhang portion 22 of the bore remains that is not occupied by the chocolate portion 20.

The chocolate portion 20 may be of a variety of configurations and the term "chocolate" is used as an example. It will be understood that the chocolate portion may be of a flavor and chemistry other than chocolate. However, it is preferred that the chocolate portion 20 have the general attributes of milk chocolate in that it remain substantially hardened at room temperature, yet melt and flow when heated. Thus, the term "Chocolate portion" will be understood to refer to a food item that is substantially hardened at room temperature in the nature of milk chocolate, yet melts and flows in the nature of milk chocolate. The chocolate portion 20 may be cylindrical, such as a chocolate available under the trade name TOOTSIE ROLL from Tootsie Roll Industries, Inc. of Chicago, Ill. The chocolate portion may also be substantially planar and rectangular, such as a segment of a chocolate bar available under the trade name HERSHEY'S from Hershey's Foods of Hershey, Pa.

The HERSHEY'S chocolate bars are characterized as a rectangular planar chocolate bar having a plurality of divisions that enable the bar to be easily broken into a number of smaller rectangular segments. In this regard, the marshmallow 12 may have a bore 14' having a substantially rectangular configuration (FIG. 4) to more closely conform to segments of Hershey's brand chocolate bars.

It will understand, however, that it is not critical that the bore and the chocolate be configured exactly, it being sufficient that the chocolate and the bore being compatible so as to enable the chocolate to be inserted into the bore when the chocolate is in a hardened state as at room temperature. It will also be understood that the marshmallow is somewhat pliant and the bore will tend to stretch to accommodate the chocolate. Likewise, the external shape of the chocolate portion or the external shape of the marshmallow 12 is not critical. It will be understood that the marshmallow 12 is preferably cylindrical, but may be other shapes, such as rectangular.

Referring to FIG. 5, an alternative embodiment of the marshmallow configuration includes a center bore 14" of axially aligned with a length axis of the marshmallow. This embodiment allows the chocolate portion 20 to be inserted from either end, preferably so that the chocolate portion is substantially centrally located within the bore 14 so that when the chocolate portion 20 melts, the ends of the bore 14' will close to substantially inhibit seepage of chocolate.

Referring to FIG. 6, there is shown a s'mores snack prepared using the marshmallow 12 and chocolate portion 20 of FIG. 2. The marshmallow 12 having the chocolate portion 20 inserted within the bore 14 thereof may be heated, as by impaling the marshmallow on a skewer or set on a pan adjacent a heat source, such as a camp fire to toast the marshmallow and substantially melt the chocolate portion. The marshmallow/melted chocolate combination may be enjoyed in this state or, as shown in FIG. 6, positioned between comestible substrates such as graham crackers 30.

The crackers 30 are preferably pressed toward one another to sandwich the marshmallow/chocolate therein, and provide a s'mores snack. The marshmallow/chocolate assembly may be positioned between the crackers prior to heating and the entire assembly heated. As seen in FIG. 6, the open end 16 of the bore 14 tends to close and serve to maintain the chocolate within the bore 14. This advantageously inhibits spillage and other messes associated with conventional s'mores.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

What is claimed is:

1. A marshmallow system, comprising a marshmallow having an axial open-ended bore defined therein having an open end defined adjacent an edge of the marshmallow and a solid chocolate portion configured for being received axially within the bore, wherein the chocolate may be positioned as a solid within the bore so as to remain within the open-ended bore at ambient temperatures and the thus prepared marshmallow/chocolate portion exposed to heat to toast the marshmallow and substantially melt the chocolate portion.

2. The system of claim 1, wherein the bore is substantially cylindrical in cross-section.

3. The system of claim 1, wherein the bore is substantially rectangular in cross-section.

4. The system of claim 1, wherein the marshmallow is substantially cylindrical.

5. The system of claim 1, wherein the chocolate portion comprises milk chocolate.

6. The system of claim 1, wherein the bore includes an open end that tends to close to maintain the melted chocolate within the bore.

7. A method of making a s'mores snack, comprising the steps of providing a marshmallow system comprising a marshmallow having an axial bore defined therein and a chocolate portion configured for being received axially within the bore, positioning the chocolate within the bore, exposing the thus prepared marshmallow/chocolate portion to heat to toast the marshmallow and substantially melt the chocolate portion, and pressing the marshmallow and heated chocolate combination between a pair of food substrates to provide the s'mores snack.

8. The method of claim 7, wherein the bore includes an open end that tends to close to substantially maintain the melted chocolate within the bore to more effectively inhibit spillage and other messes as compared to conventionally prepared s'mores.

9. The method of claim 7, wherein the steps are performed sequentially.

10. The method of claim 7, wherein the chocolate portion comprises milk chocolate.

* * * * *